(12) United States Patent
Theppasandra et al.

(10) Patent No.: US 9,313,647 B2
(45) Date of Patent: Apr. 12, 2016

(54) DYNAMIC CONFIGURATION OF SUBSCRIBER DATA, SUCH AS DATA FOR SUBSCRIBERS OF MOBILE DEVICE SERVICES

(71) Applicant: T-Mobile USA, Inc., Bellevue, WA (US)

(72) Inventors: Janardhan Theppasandra, Issaquah, WA (US); Rob Piscopo, Bellevue, WA (US); Nancy Bostdorff, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 168 days.

(21) Appl. No.: 13/889,270

(22) Filed: May 7, 2013

(65) Prior Publication Data

US 2014/0004855 A1    Jan. 2, 2014

Related U.S. Application Data

(63) Continuation of application No. 12/537,140, filed on Aug. 6, 2009, now Pat. No. 8,437,745, which is a continuation of application No. 12/339,810, filed on Dec. 19, 2008, now abandoned.

(60) Provisional application No. 61/016,347, filed on Dec. 21, 2007.

(51) Int. Cl.
  *H04W 8/20* (2009.01)
  *H04W 60/04* (2009.01)
  *H04W 8/12* (2009.01)

(52) U.S. Cl.
  CPC ............... *H04W 8/205* (2013.01); *H04W 8/20* (2013.01); *H04W 60/04* (2013.01); *H04W 8/12* (2013.01)

(58) Field of Classification Search
  CPC ............ H04W 8/20; G06F 15/16; H01S 4/00; H04Q 7/20; H04Q 7/00
  USPC ....................... 455/414.1, 432.1, 432.2, 432.3
  See application file for complete search history.

(56) References Cited

U.S. PATENT DOCUMENTS

| | | | |
|---|---|---|---|
| 5,943,619 A | | 8/1999 | Coyne et al. |
| 6,018,657 A | * | 1/2000 | Kennedy et al. ........... 455/426.1 |

(Continued)

FOREIGN PATENT DOCUMENTS

| | | | | |
|---|---|---|---|---|
| WO | WO-9808354 | | 2/1998 | |
| WO | WO-9859503 | | 12/1998 | |
| WO | WO/00/62560 | * | 10/2000 | ............... H04Q 7/00 |
| WO | WO-2009082692 | | 7/2009 | |

OTHER PUBLICATIONS

International Search Report and Written Opinion, International Application No. PCT/2008/087681, Applicant: T-Mobile USA, Inc., Filed on Dec. 19, 2008, Date of Mailing Feb. 11, 2009, 10 pages.
3GPP TS 03.78.V 6.11.1 (Aug. 2002), Customized Applications for Mobile Enhanced Logic (CAMEL), Phase 2, Stage 2 (Release 1997), 199 pages.
3GPP TS 29.002 V6.1.0 (Mar. 2003) Technical Specification, 3rd Generation Partnership Project, Technical Specification Group Core Network, Mobile Application Part (MAP) specification, Release 6, pp. 1-500 (Part 1 of 3).

(Continued)

*Primary Examiner* — Myron K Wyche
(74) *Attorney, Agent, or Firm* — Perkins Coie LLP

(57) ABSTRACT

A system for registering a mobile device located in a network outside a device's home network is described. In some examples, the system receives a message including contents associated with a location of the mobile device, and extracts the contents of the received message. The system matches the extracted contents to one or more rules associated with an adjustment of subscriber data within a registration database for the home network, adjusts the data, and registers the mobile device having the adjusted data.

19 Claims, 9 Drawing Sheets

(56) References Cited

U.S. PATENT DOCUMENTS

| | | | |
|---|---|---|---|
| 6,526,033 | B1 | 2/2003 | Wang et al. |
| 7,187,928 | B1 | 3/2007 | Senn et al. |
| 8,437,745 | B2 | 5/2013 | Theppasandra et al. |
| 2006/0015556 | A1* | 1/2006 | Pounds et al. .................. 709/203 |
| 2006/0135160 | A1 | 6/2006 | Jiang |
| 2007/0072590 | A1* | 3/2007 | Levitan ...................... 455/414.1 |
| 2007/0093202 | A1* | 4/2007 | Hwang et al. ................ 455/3.06 |
| 2009/0010398 | A1* | 1/2009 | Nelson et al. ................... 379/45 |
| 2009/0093248 | A1* | 4/2009 | Srinivasan .................... 455/433 |
| 2009/0312015 | A1* | 12/2009 | Jessen et al. ............... 455/432.1 |

OTHER PUBLICATIONS

3GPP TS 29.002 V6.1.0 (Mar. 2003) Technical Specification, 3rd Generation Partnership Project, Technical Specification Group Core Network, Mobile Application Part (MAP) specification, Release 6, pp. 1001-1339 (Part 3 of 3).

3GPP TS 29.002 V6.1.0 (Mar. 2003) Technical Specification, 3rd Generation Partnership Project, Technical Specification Group Core Network, Mobile Aplication Part (MAP) specification, Release 6, pp. 501-1000 (Part 2 of 3).

European Patent Office, Extended European Search Report, EP Patent Application 08864737.5, mailed Mar. 3, 2014, 8 pages.

\* cited by examiner

| | |
|---|---|
| Telephony Services | Ability to make/receive voice calls |
| SMS services | Ability to send/receive SMS calls |
| Asynchronous Circuit Switched Data | Ability to send/receive circuit switched data |
| Synchronous Circuit Switched Data | Ability to send/receive circuit switched data |
| Fax Services | Ability to send/receive fax |
| | |
| Call Forwarding | Ability to make/receive voice calls |
| Call Barring | Call Barring like Outgoing calls, incoming calls, international Calls etc. |
| Call Hold | Call hold feature |
| Call Waiting | Call Waiting feature |
| CLIP/CLIR | Calling name presentation/restriction |
| COLP/COLR | Called name presentation/restriction |
| Calling Name feature | Calling name display feature |
| Miscellaneous | Explicit call transfer, Closed User group, etc. |
| Originating CAMEL Subscription Information | |
| Originating CAMEL subscription | Ability to make originating CAMEL calls |
| Camel Phase | Which phase of CAMEL (2, 3 or 4) |
| SCF Address | Which SCF handles the call |
| Service Key | Service key that identifies the service to execute |
| Call Treatment if SCF unavailable | Explicit call transfer, Closed User group, etc. |
| Miscellaneous | Any other OCSI related data |
| Terminating CAMEL Subscription Information | |
| Terminating CAMEL subscription | Add/remove ability to receive Terminating CAMEL calls |
| Camel Phase | Which phase of CAMEL (2, 3 or 4) |
| SCF Address | Which SCF handles the call |
| Service Key | Service key that identifies the service to execute |
| Call Treatment if SCF unavailable | Call Release or Call Continue |
| Miscellaneous | Any other TCSI related data |
| | |
| PDP related data | |
| | |
| INAP related information | Data like Originating IN Category Key, Terminating in Category Key |
| IFC for IMS | Initial Filter Criteria |

*FIG. 5*

DYNAMIC CONFIGURATION OF SUBSCRIBER DATA, SUCH AS DATA FOR SUBSCRIBERS OF MOBILE DEVICE SERVICES

CROSS REFERENCE TO RELATED APPLICATIONS

This application is a continuation of U.S. patent application Ser. No. 12/537,140, filed Aug. 6, 2009, now U.S. Pat. No. 8,437,745, which is a continuation of U.S. patent application Ser. No. 12/339,810, filed Dec. 19, 2008, which claims priority to U.S. Provisional Application No. 61/016,347, filed on Dec. 21, 2007, entitled DYNAMIC CONFIGURATION OF SUBSCRIBER DATA, SUCH AS DATA FOR SUBSCRIBERS OF MOBILE DEVICE SERVICES, all of which are incorporated by reference in their entirety for all purposes.

BACKGROUND

Users of mobile devices (such as cellular telephones) frequently use their mobile devices on networks other than their home carrier network. For example, users may travel to a geographic area that is not covered by their home carrier network, or may travel internationally and connect to an international network in order to use their mobile device.

Mobile device users often encounter problems that arise due to processing of wireless calls across home and foreign networks. A mobile device user may incur substantial roaming charges relating to calls received while using their mobile devices on foreign carrier networks. For instance, a call to the mobile user's device (while the device is connected to a foreign carrier network) that goes unanswered or is rejected may be forwarded from the foreign carrier network back to the home carrier network (such as to the user's voicemail), thereby causing the user to incur roaming charges for two separate legs of a single call. A foreign network may be any network (such as an international network, partner network, and so on), that is not a device's home carrier network. Further, calls to the mobile device may fail due to the unique configurations of some foreign carrier networks. Thus, there exists a need to dynamically process communications within the home carrier network in order to, for example, deflect certain calls to the user's device or voicemail, or otherwise ignore services provided by the unfamiliar network.

Currently, there are some established options to assist users in avoiding such problems. For example, (1) the user's home network may provide a service that allows a pre-selected list of calls to reach the user in the unfamiliar network, (2) the user may initiate an unconditional, non-dynamic call forwarding process that deflects all calls to the user to voicemail or any other forwarded-to number (3) the user may contact a customer care facility to manually activate call forwarding to voicemail or other forwarded-to number, and/or, (4) all call processing to be suppressed in registration database (such as an HLR or HSS database).

Although each of these established options provides some help to users roaming on unfamiliar networks, they do not provide a complete solution to the problems described above. They require user interaction to be performed or prevent call setup from occurring. Additionally, many of the options do not work unless the user's mobile device is switched off, which can be quite burdensome to the user. These and other problems exist with respect to assisting users of mobile devices located outside their home networks.

BRIEF DESCRIPTION OF THE DRAWINGS

FIG. 5 is a table illustrating example services that can be adjusted by the system.

DETAILED DESCRIPTION

A system and method for dynamically adjusting a mobile device subscriber's data in a registration database (e.g., HLR, HSS, or other database) during a registration or a location update is disclosed. In some cases, adjusting the subscriber's data in the database alters subsequent call characteristics between the mobile device and a network supporting the mobile device. In some cases, adjusting the subscriber's data in the database alters the usability of some or all features supported by the device and/or the network.

In some examples, the system adjusts the subscriber's data when the mobile device is connected to a network different than the subscriber's home carrier network, such as an international network, a partner network, and so on. For example, when a mobile device is connected to a foreign carrier network, the home carrier network in the disclosed system may (1) receive a "location update" message from the device, (2) temporarily adjust the subscriber's data within the registration database of the home network to reflect the mobile device's updated location, and (3) modify the characteristics of how to handle incoming communications to the mobile device using the dynamically modified subscriber data. Once the mobile device registers on the home network, the system automatically resets the subscriber data back to the previous state.

Thus, in some cases the system registers a mobile device, or updates its location, to a home carrier network providing services to the mobile device, by (1) receiving a message from the mobile device, wherein the message includes information related to a location (such as a cell tower location, an IP-address or other location data) of the mobile device outside the network, (2) determining that the information matches one or more rules related to the provided services, and (3) adjusting subscriber data associated with the mobile device and associated with the provided services based on the matched one or more rules.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Suitable System

Figure 1:
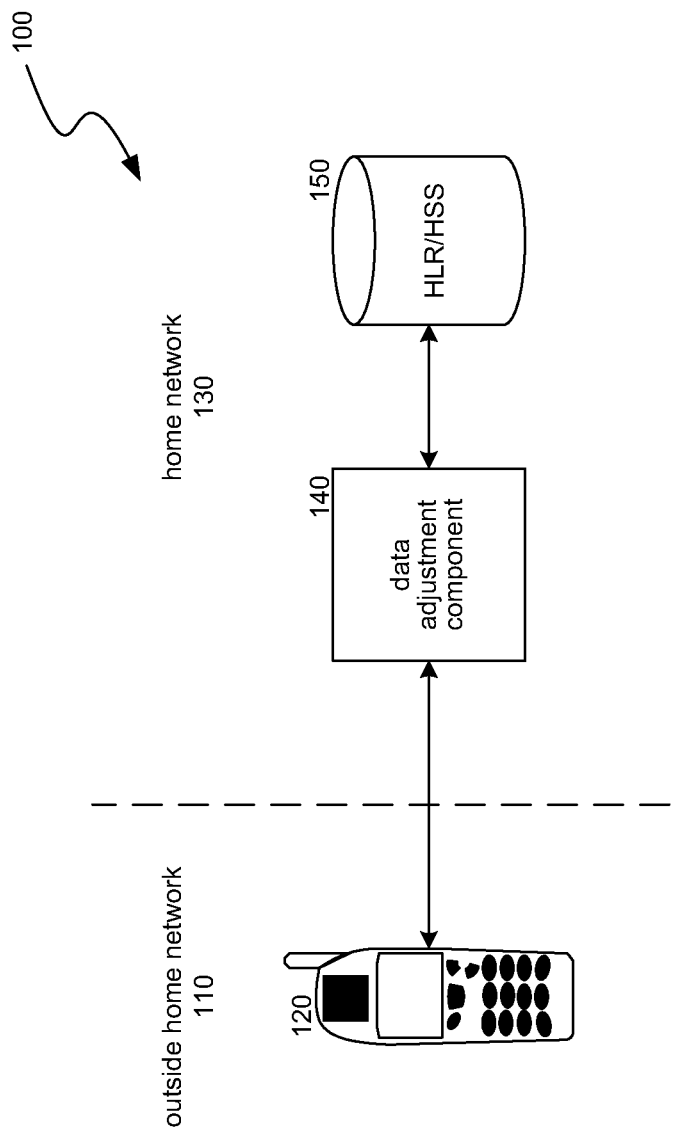
FIG. 1 is a block diagram illustrating a connection between a mobile device and a home network.

FIG. 1 is a block diagram 100 illustrating a system for registering mobile devices connected to a network other than the user's home carrier network. The system 100 includes a home network 130 that contains a registration database 150 (in this Figure, a home location register (HLR) when the network 130 is a GSM network or a home subscriber server (HSS) when the network is an IP-based wireless telecommunications network such as IMS network or miscellaneous subscriber database). The home network 130 also includes a data adjustment component 140 that adjusts subscriber data associated with mobile device 120 located in a roaming or foreign carrier network 110 when the device attempts to register with the database 150. The functionality of the data adjustment component or node is described in detail herein. The data adjustment component can be programmable logic or code on one or more networks and serves to implement the functionality.

As shown in the example of FIG. 1, the data adjustment component 140 is a separate component within the home network 130 that receives registration request messages from the mobile device 120 and acts to modify some or all data associated with the subscriber of the mobile device that is stored within the database 150. Alternatively, the data adjustment component 140 may be located within or be part of the database 150 (such as within an HLR or HSS). In these cases messages are directly received by the database 150 and the data adjustment component dynamically adjusts the data stored in the database. Of course, the data adjustment component can be independent of, but communicate with, the home network and its components.

Figure 2A:
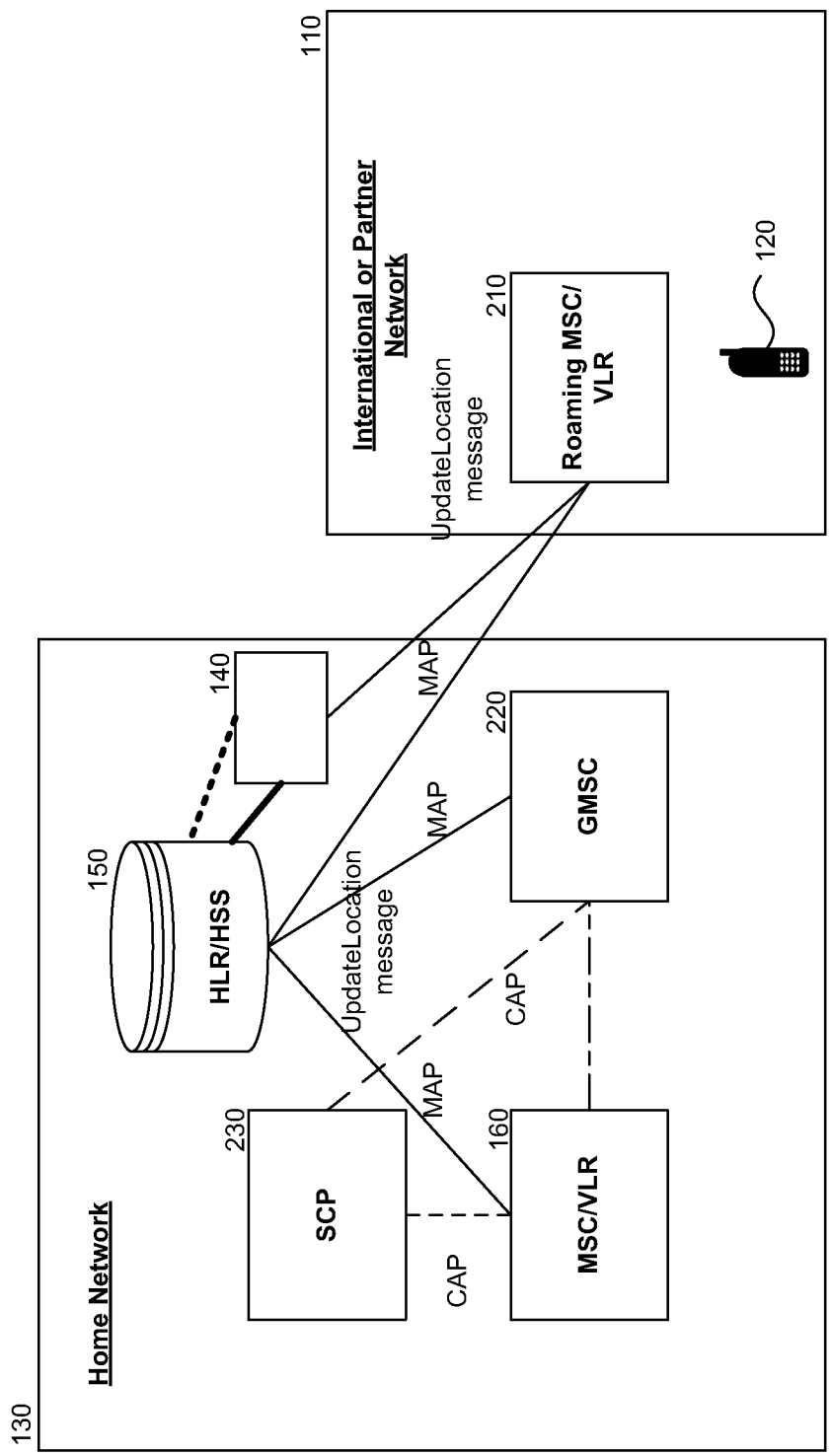
FIGS. 2A-2C are block diagrams illustrating connections between a mobile device and a home network.
Figure 2B:
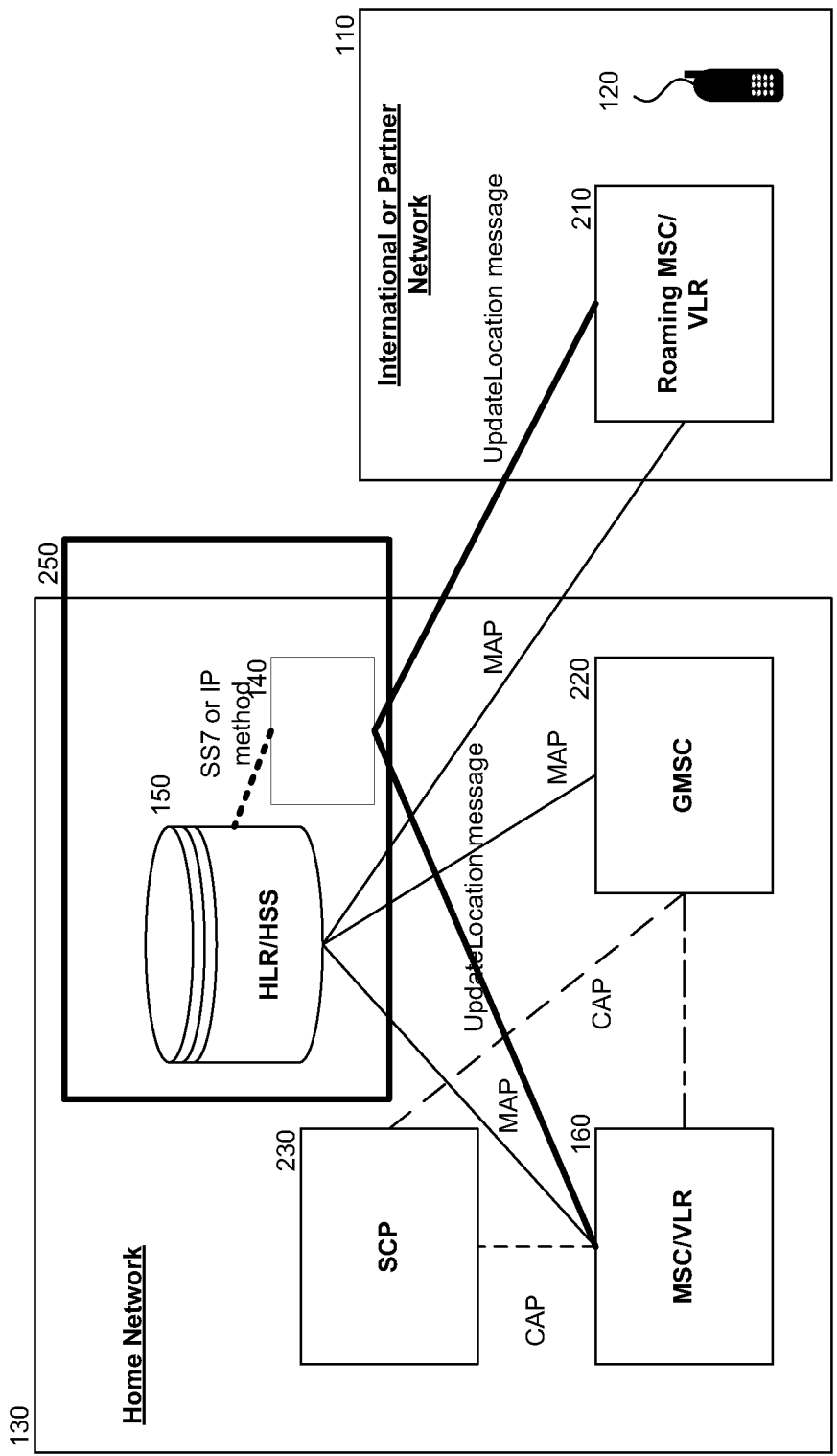
Figure 2C:
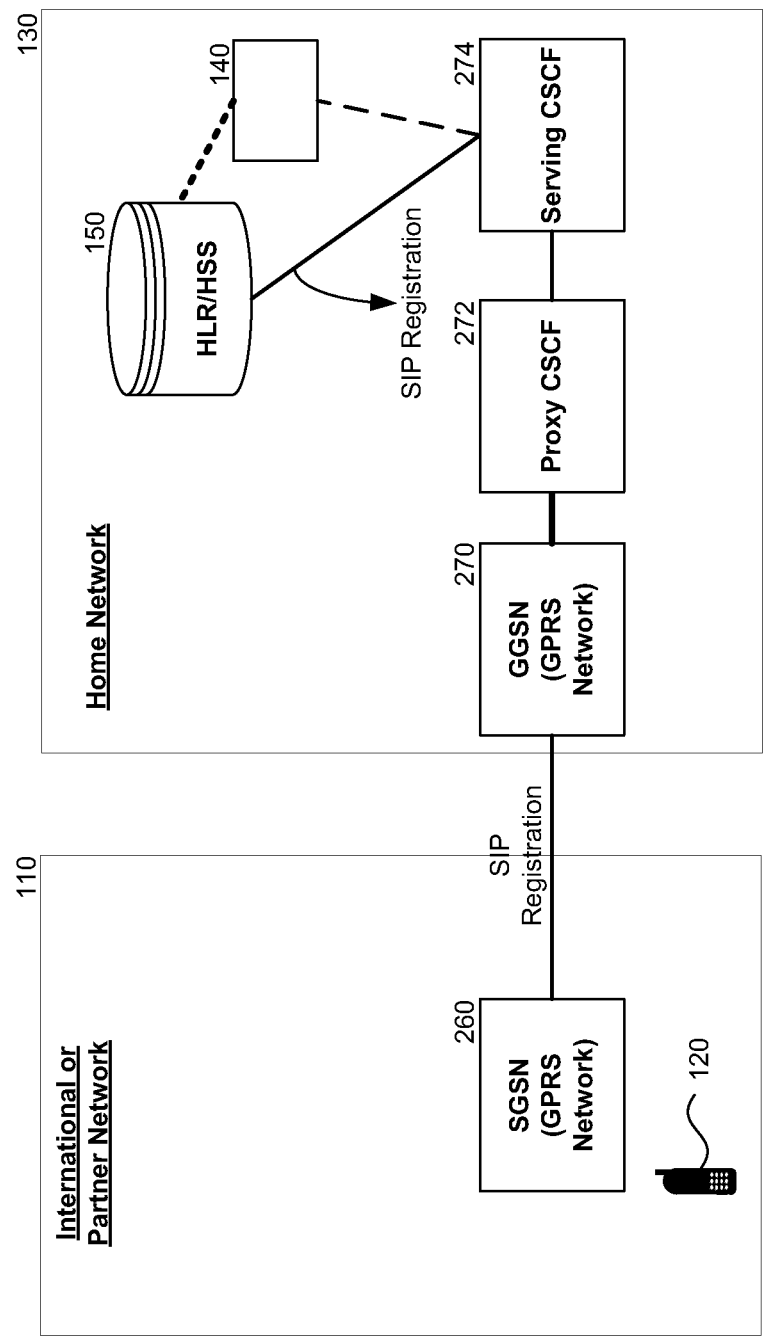
Figure 3:
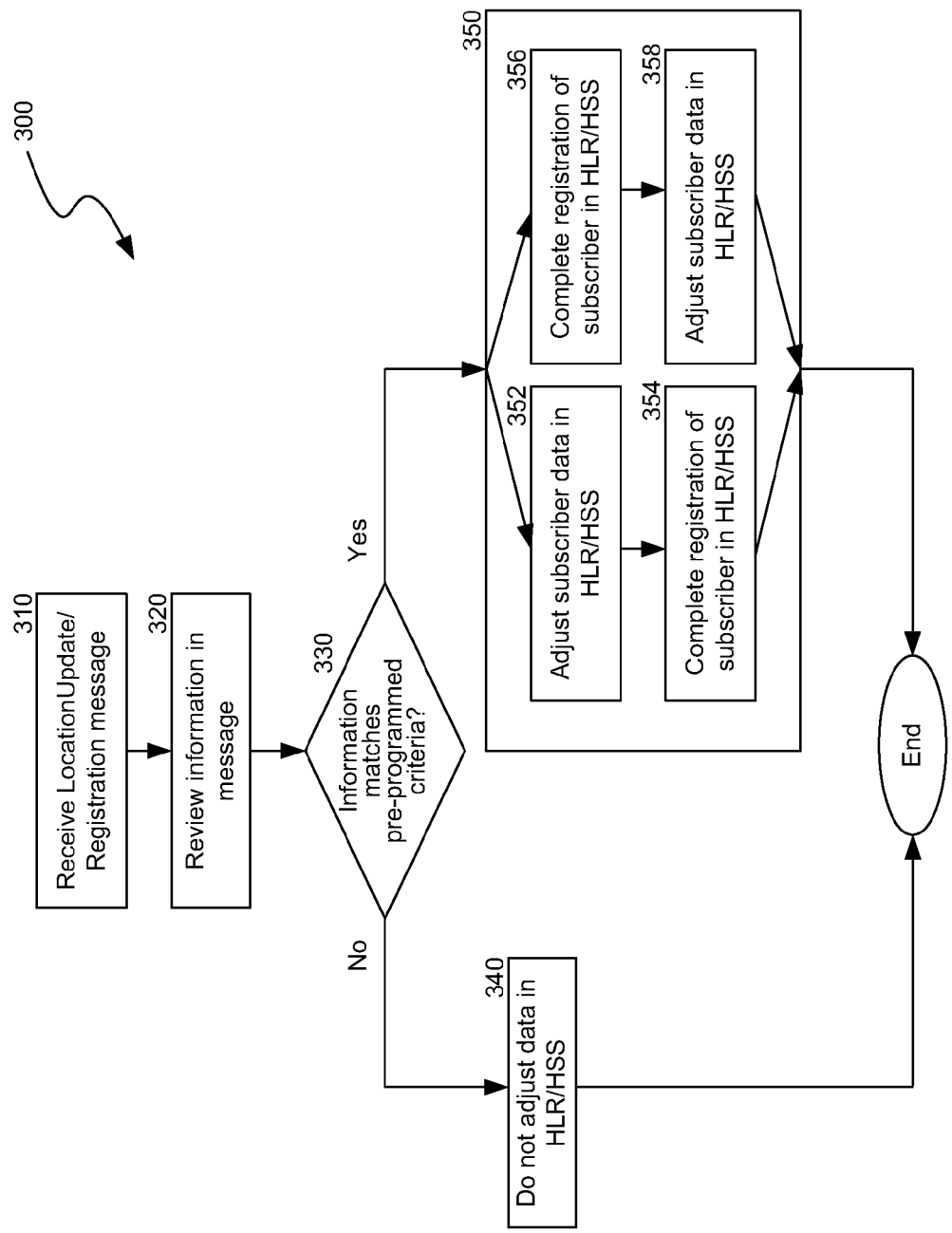
FIG. 3 is a flow diagram illustrating a routine for registering a mobile device with a network.

FIGS. 2A-2C are block diagrams illustrating connections between a mobile device, a roaming or foreign network, and a home network, while the mobile device is roaming on the roaming or foreign network. Referring to FIG. 2A, an example of the data adjustment component 140 as an individual node of the home network is shown. For example, a mobile device 120 located within a roaming or foreign network 110 attempts to connect to the network 110, and sends an "UpdateLocation" message via a roaming registration database (such as a Visitor Location Register or VLR) 210 to the database 150 of the home network 130. The message is first received by the data adjustment component 140, passes to the database 150 along with instructions to adjust the subscriber's data in the database 150, and updates the roaming registration database 210 within the roaming or foreign network 110 to reflect these adjustments.

FIG. 2B shows the data adjustment component 140 as being contained within the database 150. The database 150 receives a registration message from a mobile device 120 via a roaming MSC or VLR 210. The data adjustment component 140 may intercept the registration message and send another registration message within the database 150 including instructions to adjust subscriber data.

FIG. 2C shows the system within a next generation network, where the data adjustment component 140 is located between a serving call session control function (S-CSCF) 274 and database, receives SIP (session initiation protocol) registration messages from one or more of the S-CSCFs, and updates the subscriber data within the database 150 based on the contents of the SIP registration messages.

Registering a Subscriber Device with a Registration Database

As described above, the system (including the data adjustment component) acts to receive messages from a mobile device located outside a home network and update data related to the mobile device, such as subscriber data for the mobile device. A flow diagram illustrating a routine 300 for registering a subscriber mobile device located outside of a home network is shown. In step 310, the system receives a message from a mobile device located outside its home network. The message may be an "UpdateLocation" message, a registration message, a SIP message (in next generation networks) or other message that initiates a session between a mobile device and a home carrier network.

In step 320, the system reviews the contents of the message. For example, the system extracts or retrieves data or information from the message, such as data that indicates the mobile device is roaming internationally. The system may also extract other contents, such as contents associated with services provided to a device by a home or partner network, contents that identify the type of device or functionality of the device, and so on.

In step 330, the system determines whether the reviewed information (or a portion of the reviewed information) matches pre-programmed criteria, such as one or more stored rules used to determine actions to be performed. For example, the system may contain a rule such as "for international roaming, forward all incoming calls to the subscriber's voicemail." Thus, should a reviewed message include contents that indicate a subscriber is roaming, the system determines there is a match to the above rule.

When the information from the message matches one or more of the rules, routine 330 proceeds to step 350 and the system adjusts the subscriber data related to the mobile device based on the rule that matched the information and registers the subscriber within the registration database, else routine 330 proceeds to step 340 and no data is adjusted. In some cases, the system adjusts the subscriber information before registration of the subscriber. For example, routine 300 may proceed from step 330 to step 352 and adjust the subscriber data in the registration database and then proceed to step 354, wherein the system completes the registration of the subscriber. In some cases, the system may first register the subscriber, and then adjust subscriber information. For example, routine 300 may proceed from step 330 to step 356 and complete registration of a subscriber within the registration database before proceeding to step 358 in order to adjust the subscriber data within the registration database.

Referring to the above example, any incoming calls will be forwarded to voicemail because the system receives a message containing contents indicating the subscriber is roaming (step 310), extracts the contents (step 320), determines that the extracted contents match a rule that causes subscriber data to be adjusted (step 330), applies the rule and adjusts the data and registers the device (step 350) with the adjusted data.

Figure 4:
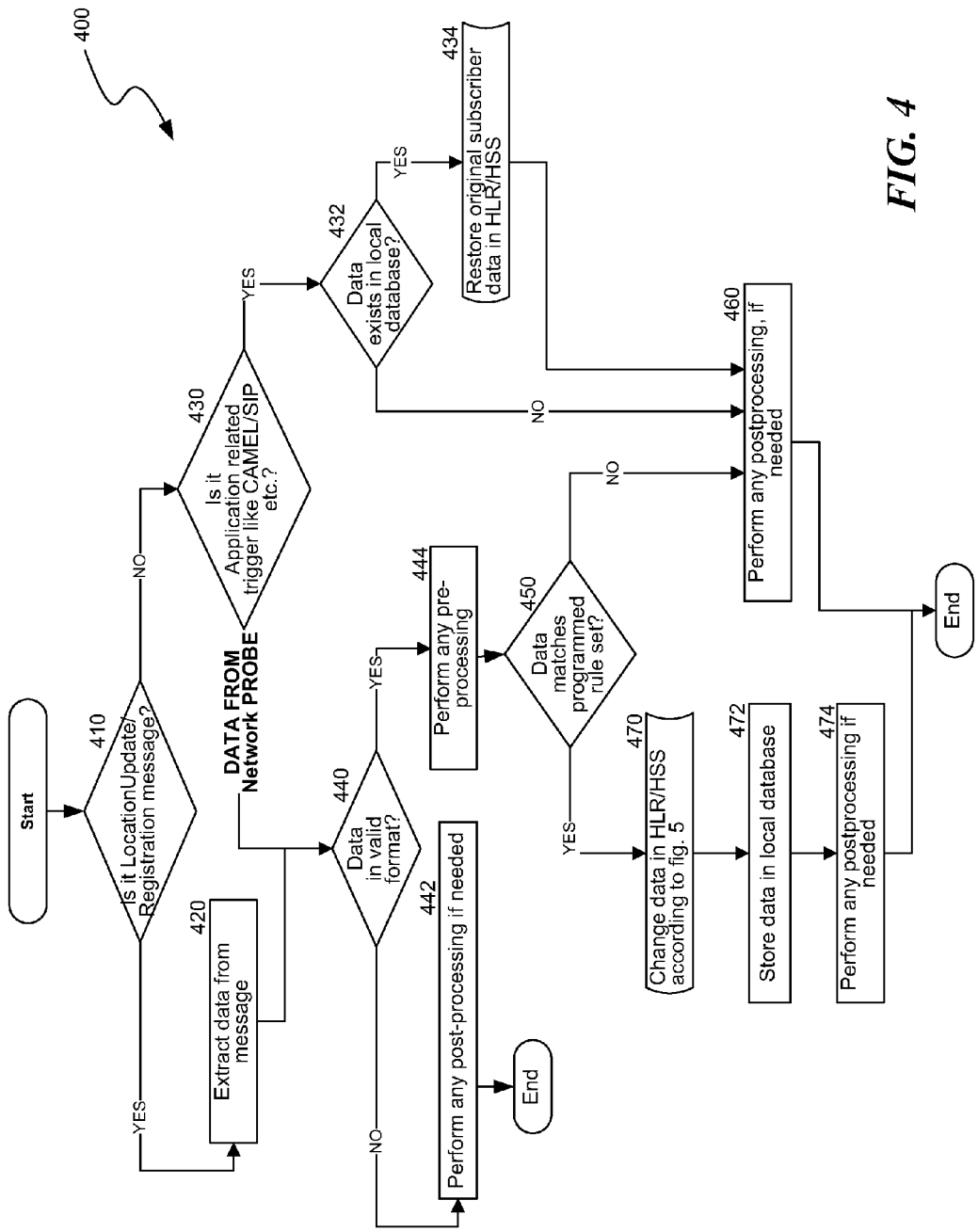
FIG. 4 is a flow diagram illustrating a routine for modifying subscriber data.

Referring to FIG. 4, a flow diagram illustrating a routine 400 for modifying subscriber data based on the contents of a received message from a mobile device is shown. In block 410, the system determines if the received message is a "LocationUpdate" or registration message. If the message contains "LocationUpdate" registration based contents, routine 400 proceeds to block 420, else routine 400 proceeds to block 430. In block 420, the system extracts the contents of the message (such as data that relates to or identifies the contents). In block 430, the system determines whether the message is an application related trigger, such as a CAMEL (Customized Applications for Mobile Networks Enhanced Logic) or SIP based trigger. If the message is not an application based trigger, routine 400 proceeds to block 440, else routine 400 proceeds to block 432. In block 432, the system checks whether the data is already stored within the registration database. If the data is already within the database, the system proceeds to block 434, restores the original data in the database, and ends. If the data is not within the database, routine 400 proceeds to block 460, performs any necessary processing of the message (such as updating the database), and ends. Another trigger to block 440 is a trigger from network probes, or other methods.

At block 440, when the system determines that the message is a "LocationUpdate" registration message or contains an application related trigger, the system checks whether the extracted data is in a valid format. If the data is not in a valid format, the system optionally processes the data (block 442), such as to remove extraneous or non-useful data, and ends. If the data is in a valid format, the system, at block 444, preprocesses the data. For example, the system may format the data, build commands and so on. At block 450, the system determines whether the data matches one or more rules stored within the system. If the data does not match any rules, routine 400 proceeds to block 460 for processing and ends. If the data does match one or more rules, routine 400 proceeds to block 470.

Examples of rules that may be matched include determining if the data indicates that a user is roaming, that a user is within a partner network, that a user is at a certain access point (for example, in IP-based wireless telecommunications networks), and so on. In addition to the type of network, the system may match rules based on the type of device within the network (e.g., a pre-paid based mobile device, a post-paid based mobile device, a CAMEL device, an IP-based wireless telecommunications device) and/or based on the level of service already provided to the user or the device associated with the user. For example, the system may determine the subscriber's home network does not provide some functionality offered at the current location, and update the subscriber data to provide the user with the added functionality when the user is within the current location.

At block 470, the system changes the subscriber data within the registration database according to the matched rule. For example, subscriber data related to basic services provided to a user, supplementary services provided to a user, CAMEL based services, and/or other services that allow users to perform certain actions using the system may be changed, augmented, updated, removed, and/or added to the registration database when a rule is matched. Further details regarding subscriber data that may be augmented by the system are shown in FIG. 5.

At block 472, the system stores any original data in a local database for later recovery or retrieval when the mobile device leaves the network. This data can be later used to re-adjust the adjusted subscribed data to a previous or original state. At block 474, the system performs any additional processing, and ends.

As discussed herein, FIG. 5 is a table 500 that shows a variety of services that may be affected by adjusting the subscriber data within the registration database. For example, when the system matches data from a registration message that indicates the mobile device is roaming in an international network, the system may adjust subscriber data to allow the basic services 510 provided by the network and prevent the supplementary services 520. Table 500 shows a variety of services, however, one of ordinary skill in the art will appreciate that the system may adjust data to allow, prevent, or modify other services not shown in the table.

Example Process Flows

Figure 6A:
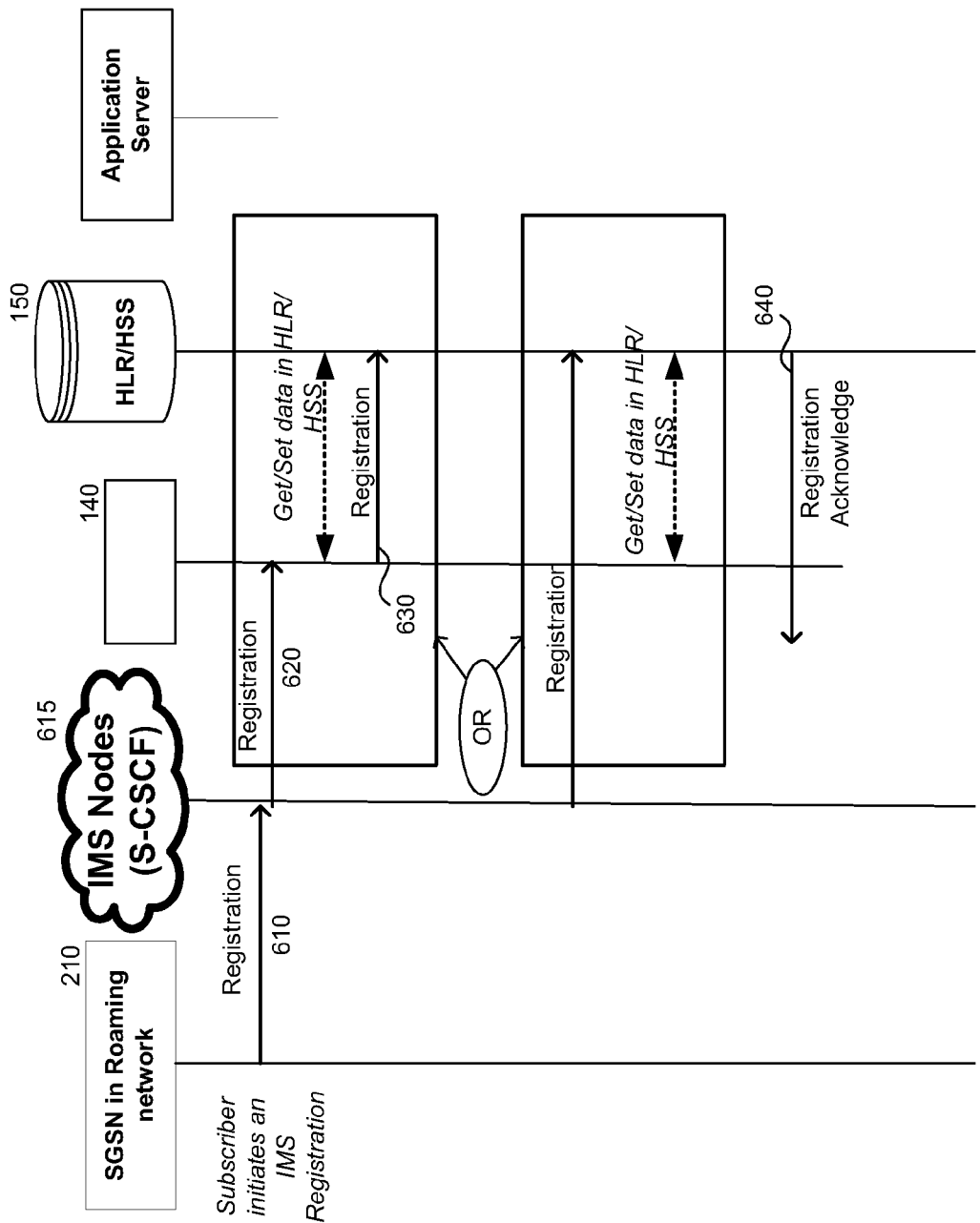
FIGS. 6A-6B are schematic diagrams illustrating example process flows between a mobile device and a registration database.
Figure 6B:
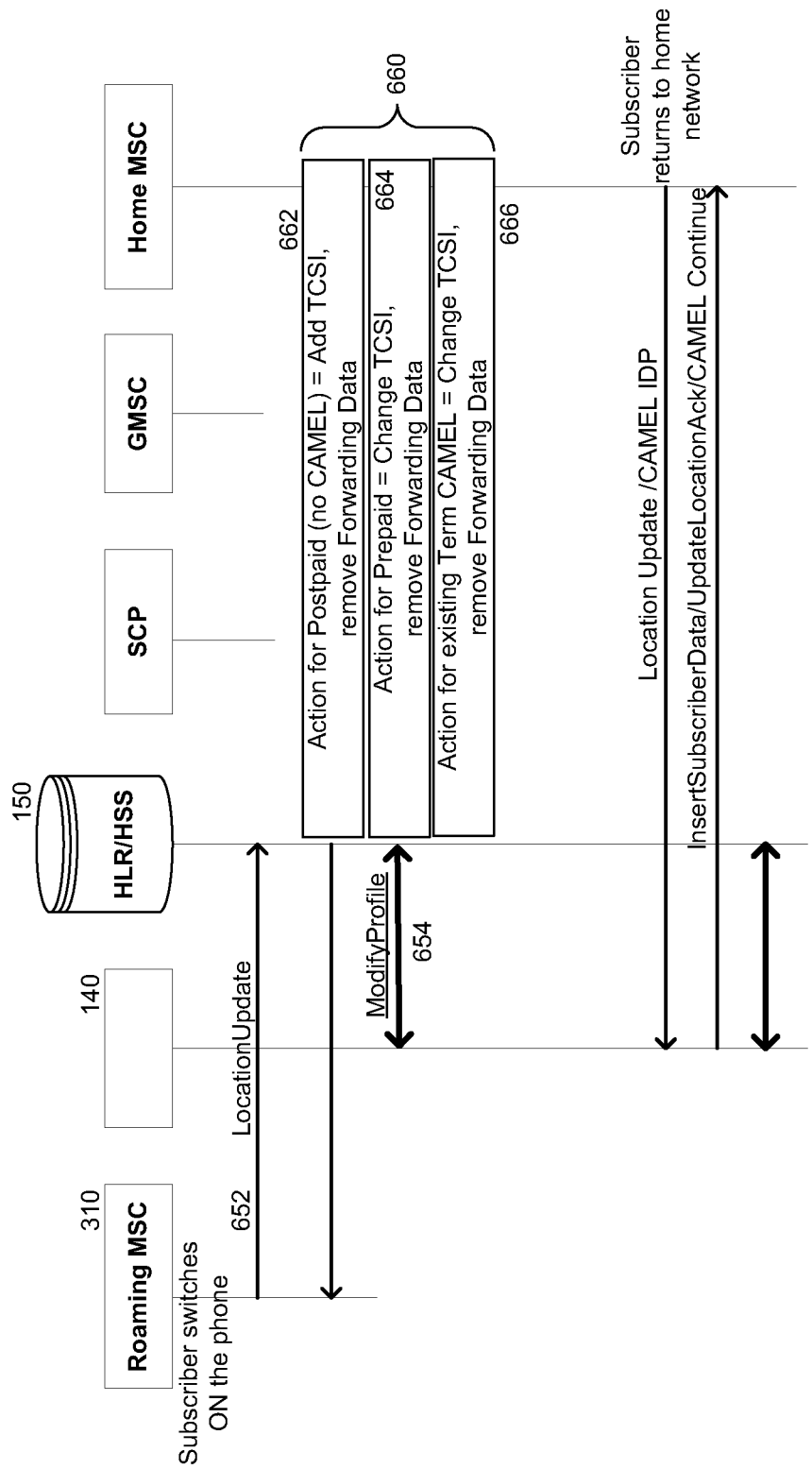

FIGS. 6A-6B are schematic diagrams illustrating example process flows between a mobile device and a registration database. Referring to FIG. 6A, process flows within a generic network 600 are shown. For example, a subscriber turns on his/her phone 120 and initiates an IMS (IP Multimedia System) session with a partner network. For example, a roaming SGSN 210 initiates the session by sending a registration message 610 to a node 615 within the IMS. A second registration message 620 is sent from the node 615 to the registration database 150, which is first received by the system, such as by the data adjustment component 140. The system extracts data from the message (e.g., data related to the access network used by the phone) and adjusts the subscriber data within the registration database 150 based on the extracted data, forwarding 630 the registration message to the registration database 150. The registration database 150 then sends back an acknowledgement message 640 to the phone.

Referring to FIG. 6B, process flows 650 for a roaming specific adjustment of subscriber data are shown. For example, the system receives a registration message 652 and sends a message 654 to modify the subscriber data within the registration database 150. The system may perform a variety of different actions 660 depending on the type of device roaming within the network. For example, when the system determines that the registration message is received from a post-paid device (without CAMEL), the system may perform an action 662 of adding TCSI data and removing forwarding data from the subscriber data within the registration database 150. However, when the system determines that the registration message is received from a pre-paid device, the system may perform an action 664 of changing TCSI data as well as removing forwarding data from the subscriber data within the registration database 150. Similarly, the system may perform similar action 666 for existing term CAMEL devices.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database"

is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the system can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

We claim:

1. A system in a telecommunications network for modifying call handling procedures for a mobile device, the system comprising:
   at least one processor;
   a match component,
      wherein the match component is configured to match contents from a received message to one or more rules associated with an adjustment of subscriber data within a registration database for the home network,
      wherein the received message includes data indicating a mobile device is roaming in a partner network of a home network for the mobile device; and
      wherein contents of the received message or the one or more rules identify services available to the mobile device in the partner network that are not available in the home network;
   a data adjustment component,
      wherein the data adjustment component is configured to adjust data within the registration database related to services provided by the home network to a subscriber associated with the mobile device in response to the match to the one or more rules; and
      wherein the data adjustment module adjusts the data within the registration database to provide the mobile device with the services available in the partner network; and
   a device registration component,
      wherein the device registration component is configured to register the mobile device with the adjusted data.

2. The system of claim 1, wherein the data adjustment component is located within a home location registry for the telecommunications network, and wherein the system further comprises a device registration component,
   wherein the device registration component is configured to register the mobile device with the adjusted data.

3. The system of claim 1, wherein the data adjustment component is located in a device within the telecommunications network but outside of a home location registry for the telecommunications network.

4. The system of claim 1, wherein the received message includes a LocationUpdate registration message.

5. The system of claim 1, wherein the received message includes an application trigger.

6. A method for use with a registration database for a home network in a wireless communication system that communicates with at least one mobile device, the method comprising:
   matching contents from a received message to at least one rule associated with an adjustment of subscriber data within a registration database for the home network,
      wherein the mobile device is roaming in another network;
   adjusting data within the registration database for the home network to provide services that are available in the other network that are not provided by the home network to the mobile device when the mobile device is roaming in the other network,
      wherein the registration database includes a home location register or a home subscriber server; and,
   re-adjusting the data within the registration database to a previous state after a message is received indicating the mobile device is back within the home network for the mobile device.

7. The method of claim 6, wherein adjusting the data within the registration database includes adjusting data associated with reception of incoming calls to the mobile device.

8. The method of claim 6, wherein adjusting the data within the registration database includes adjusting data associated with data services provided to the mobile device by the home network.

9. The method of claim 6, wherein the services provided by the other network and not provided by the home network include one or more of call forwarding services, call barring services, call hold services, call waiting services, calling name presentation services, calling name restriction services, asynchronous circuit switched data services, synchronous circuit switched data services, or faxed services.

10. A non-transitory computer-readable medium storing instructions, which when executed by at least one data processing apparatus, registers a mobile device located in a network outside a home carrier network providing services to the mobile device, comprising:
   determining that information from a received message related to the mobile device matches one or more rules associated with services provided to the mobile device by the home carrier network,
      wherein the message includes information indicating that the mobile device is located outside the home carrier network,
      wherein the one or more rules includes at least one rule that defines an adjustment to the services provided to the mobile device by the home carrier network when the information indicating that the mobile device is located outside the home carrier network indicates that the mobile device is roaming;
      wherein the adjustment to the service includes adding a service that is available to the mobile device in the network outside the home carrier network that is not available in the home carrier network; and temporarily adjusting subscriber data associated with the mobile device and associated with the provided services based on the matched one or more rules, wherein the subscriber data is temporarily adjusted in a home location register or a home subscriber server.

11. The non-transitory computer-readable medium of claim 10, wherein the information indicating that the mobile device is located outside the home carrier network includes information identifying a cell tower.

12. The non-transitory computer-readable medium of claim 10, wherein the information indicating that the mobile device is located outside the home carrier network includes information identifying an IP address accessed by the mobile device.

13. The non-transitory computer-readable medium of claim 10, wherein the determining includes determining that the mobile device is roaming on an international network.

14. The non-transitory computer-readable medium of claim 10, wherein the determining includes determining that the mobile device is proximate to a certain access point.

15. The non-transitory computer-readable medium of claim 10, wherein the determining includes determining that the mobile device is a certain device type.

16. The non-transitory computer-readable medium of claim 10, wherein the determining includes determining that the location of the mobile device provides services not provided by the home carrier network.

17. The non-transitory computer-readable medium of claim 10, wherein temporarily adjusting the subscriber data includes adjusting subscriber data associated with basic services provided by the home carrier network to the mobile device.

18. The non-transitory computer-readable medium of claim 10, wherein temporarily adjusting the subscriber data includes adjusting subscriber data associated with supplementary services provided by the home carrier network to the mobile device.

19. The non-transitory computer-readable medium of claim 10, wherein temporarily adjusting the subscriber data includes adjusting Customised Applications for Mobile networks Enhanced Logic (CAMEL) subscription information for the mobile device.

* * * * *